United States Patent [19]

Hasebe et al.

[11] Patent Number: 5,935,243
[45] Date of Patent: *Aug. 10, 1999

[54] LICENSEE NOTIFICATION SYSTEM

[75] Inventors: Takayuki Hasebe; Naoya Torii, both of Kawasaki, Japan

[73] Assignee: Fujitsu Ltd., Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/673,108

[22] Filed: Jul. 1, 1996

[30] Foreign Application Priority Data

Aug. 31, 1995 [JP] Japan ..................... 7-224338

[51] Int. Cl.$^6$ ............... G06F 11/00; H04L 9/00
[52] U.S. Cl. ............................. 713/200; 382/23
[58] Field of Search ............... 380/3, 4, 23, 25, 380/26; 395/186, 187.01, 188.01, 182.16, 182.18, 183.12

[56] References Cited

U.S. PATENT DOCUMENTS

| | | | |
|---|---|---|---|
| 4,866,769 | 9/1989 | Karp .......................... | 380/4 |
| 5,103,476 | 4/1992 | Waite et al. . | |
| 5,204,897 | 4/1993 | Wyman ....................... | 380/4 |
| 5,287,408 | 2/1994 | Samson ...................... | 380/4 |
| 5,291,598 | 3/1994 | Grundy . | |
| 5,319,705 | 6/1994 | Halter et al. . | |
| 5,479,612 | 12/1995 | Kenton et al. ............... | 385/186 |
| 5,757,907 | 5/1998 | Cooper et al. ............... | 380/4 |

FOREIGN PATENT DOCUMENTS

| | | |
|---|---|---|
| 0 367 700 A2 | 5/1990 | European Pat. Off. . |
| 0 613 073 A1 | 8/1994 | European Pat. Off. . |
| 2 245 724 | 1/1992 | United Kingdom . |

OTHER PUBLICATIONS

European Search Report issued Oct. 6, 1997.

*Primary Examiner*—Robert W. Beausoliel, Jr.
*Assistant Examiner*—Nadeem Iqbal
*Attorney, Agent, or Firm*—Staas & Halsey

[57] ABSTRACT

There is disclosed a licensee notification system for implementing a software sales system wherein license information for converting to executable form software that is presented to a user in non-executable form is communicated to the user from a management center on condition of payment of a charge, and the software is converted into executable form at the user terminal using this license information. The subject of the licensee notification system is software that decides whether or not the correspondence relationship between user identification information and signature information stored in the license file is legitimate, and, if it is legitimate, displays the user identification information to the user before starting proper operation; or, if it is not legitimate, does not start proper operation. The licensee notification system is constituted by connecting the management center and user terminals by communication circuits. If license information is requested from the user terminal, the management center transmits license information combining in integral form the user identification information identifying the user and conversion information for converting the software to executable form. The user terminal enables the software using the conversion information contained in this license information and writes user identification information and signature information whose content is determined in accordance with the content of the user identification information to a license file that is referred to when this software is operating.

14 Claims, 6 Drawing Sheets

| USER ID | USER NAME |
|---|---|
| M0001111 | TOKKYO TARO |
|  |  |
|  |  |

| CONTENTS ID | DECODING KEY |
|---|---|
| ABC00001 | xxxxxxxx |
|  |  |
|  |  |

| CONTENTS ID | USER NAME | SIGNATURE INFORMATION |
|---|---|---|
| ABC00001 | TOKKYO TARO | zzzzzzzz |
|  |  |  |
|  |  |  |

LICENSEE NOTIFICATION SYSTEM

BACKGROUND OF THE INVENTION

1. Field of the Invention

The present invention relates to a licensee notification system employed for the sale of software using a high speed communication network such as B-ISDN and a large-capacity storage medium such as a CD-ROM.

2. Description of the Related Art

With the development of high speed communication technology such as B-ISDN (broad-band integrated services digital network) and high-capacity storage media such as CD-ROMs (compact disk read only memory) such means can now be used to distribute computer programs or video data or audio data. For example, video works which were previously supplied on video tape are now being sold stored on CD-ROM. Also, game programs etc, which contain a large amount of picture data, are being sold stored on CD-ROM. The same applies to high speed communication networks, in which the software supplier can now distribute the software by various methods. One of these methods of software sales is the so-called "locked software" sales system. In the locked software sales system, a CD ROM on which are stored a large number of software items whose functions are restricted is sold cheaply. By using the various items of software on the CD-ROM that is purchased, in a condition with the functional restrictions imposed, the end user is able to make a decision as to whether or not he needs each software item. Then, if the end user does require the software, he obtains (purchases) a restriction-removal code corresponding to this software from a management center operated by the software distributor, and is able to use this restriction-removal code to remove the functional restrictions on the software.

Figure 10:
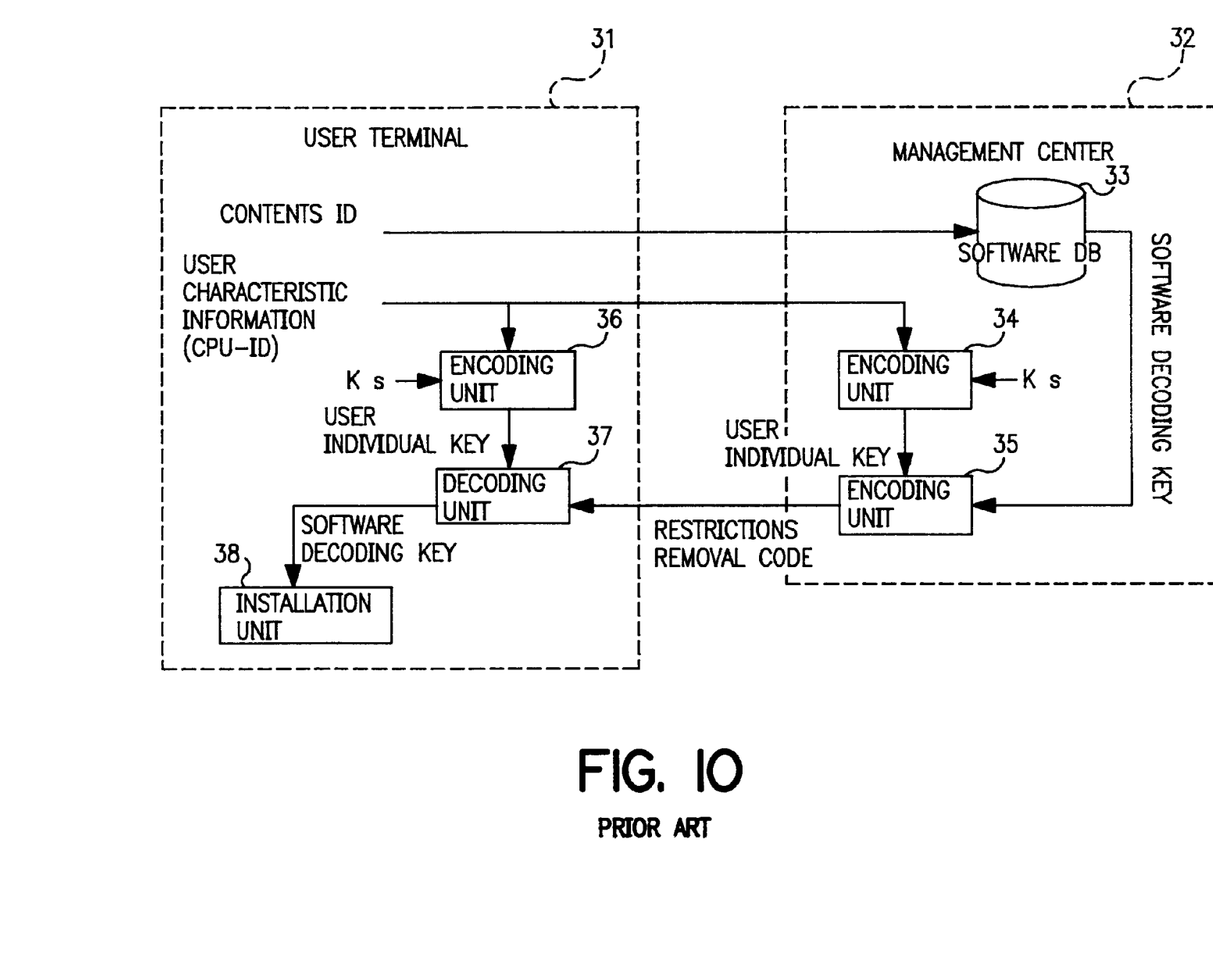
FIG. 10 is a functional block diagram showing the structure of the licensee notification system used in a prior art locked software sales system.

Such a sales system may be implemented, as a specific example, using the software sales system shown in FIG. 10. As shown in this Figure, this software sales system comprises user terminals 31 and management center 32. The user terminal 31 and the management center 32 are connected by means of a communication circuit.

When actually purchasing the software (i.e. when purchasing a restriction-removal code), the end user, using a user ID etc, sets up a communication path with the management center and executes the prescribed procedure required to request that a restriction-removal code be sent to the user terminal 31. This procedure includes the input of a "contents ID", which is information for identifying the software item that is to be purchased actually. In response to the execution of such a procedure, the user terminal 31 sends to the management center 32 the contents ID and for example the characteristic information of the user, consisting of the ID of the CPU provided in user terminal 31.

Within the management center 32, there is provided a software database (software DB) in which software decoding keys employed for encoding the various software items are stored in association with the contents ID. When a contents ID is received from user terminal 31, the software decoding key corresponding to the contents ID is read from software database 33. Also, encoding unit 34 in management center 32 generates a user individual key by encoding the user characteristic information from user terminal 31 by the key "Ks". Encoding unit 35 sends the results of the encoding of the software decoding key from software database 33 to user terminal 31 as restriction-removal code, using the user individual key from encoding unit 34.

Encoding unit 36 in user terminal 31 generates a user individual key by encoding the user characteristic information with the key "Ks". Decoding unit 37 uses the user individual key generated by encoding unit 36 to decode the restriction removal code from management center 32, thereby generating the software decoding key. Installation unit 38 then uses this software decoding key to decode the software in CD-ROM corresponding to the contents ID sent to center terminal 32: thus the software is put in a condition where it can be used with the functional restrictions removed, and, in this form, is installed on to a storage device such as a hard disk device.

With such a software sales system, it is possible to determine the software item to be purchased after actually ascertaining its contents: thus, the possibility that the purchased software might be completely different from that intended, as could happen if the purchase were made solely on the basis of the details contained in a catalogue, can be completely eliminated. Also, since the software on the CD ROM is stored in a form which is not executable without knowing special information, illicit installation can be prevented.

However, once the software has been installed, it is an extremely easy operation to copy this. Thus, the problem has arisen of unscrupulous persons copying the software without the consent of the software supplier. Various methods (so-called protection methods) of preventing such illicit copying are known but there is no way to prevent illicit copying by a person possessing knowledge at the level of the BIOS (basic input/output system). Whichever method is used, it can do no more than make it more difficult to perform illicit copying.

For this reason, software is sold in which the name of the authorized user is displayed on start-up, with the object of preventing illicit copying psychologically rather than physically. That is, the aim is to prevent illicit copying of software by displaying the name of the authorized user of the software when the illicitly copied software is executed.

However, even with such software, if the copying is inclusive of the installation software that sets the user name, when the software is run, it can be made to display the name of the person who made the illicit copy: thus, sufficient effectiveness in preventing illicit copying was not obtained.

SUMMARY OF THE INVENTION

An object of the present invention is to provide a licensee notification system whose psychological effectiveness in preventing illicit copying is very high.

A first licensee notification system according to the present invention consists in a system for implementing a software sales system in which software in non-executable form is presented to a user, and license information for converting the software into executable form is informed to the user on condition of payment of a charge, and the software is converted into executable form using this license information.

The first licensee notification system is constituted of a management center and user terminals; its subject is software which includes instructions that command a terminal to read user identification information in a license file and to notify the user identification information to the user on commencement of its operation.

The management center comprises a license information generating unit that generates license information combining in integrated form user identification information that specifies a user and conversion information for converting software to executable form.

The user terminal comprises a storage unit, a conversion unit, and license file creating unit. In more detail, the storage unit is employed for storing the license file and software converted to executable form. The license information, which is generated by the license information generating unit in the management center, is given to the conversion unit. The conversion unit then converts the software to executable form using the license information and installs it in the storage unit. The license file creating unit creates the license file which contains the user identification information contained in the license information, and stores the license file in the storage unit.

That is, in the first licensee notification system, software is installed in the user terminal so that the user identification information of the legitimate user is notified to the user on its start-up, using the license information which is generated in the management center and contains the user identification information.

A second licensee notification system according to the present invention is constituted of a management center and user terminal; its subject is software which includes instructions that commands the user terminal to read user identification information in the prescribed location in the software and to notify the user identification information to the user on commencement of its operation.

The management center comprises a license information generating unit that generates license information combining in integrated form user identification information identifying a user and conversion information for converting software into executable form.

The user terminal comprises a storage unit, a conversion unit and a software rewriting unit. Of these, the storage unit is employed for storing the software after this has been converted to executable form. The conversion unit converts the software to executable condition using the license information generated by the license information generating unit in the management center, and then installs it in the storage unit. The software rewriting unit rewrites the information of the prescribed location of the software that has been installed by the conversion unit with the user identification information contained in the license information.

That is, in this second licensee notification system, installation is performed with the content of the software rewritten such that the user identification information of the legitimate user is notified on start-up, using the license information which is generated in the management center and contains the user identification information.

The third licensee notification system according to the present invention has as its subject software that, on commencement of operation, includes instructions commanding the user terminal to read user identification information in a license file and to notify the user identification information to the user.

The management center in the third licensee notification system comprises a license information generating unit that generates license information consisting of an integral combination of conversion information for converting the software to executable form and user identification information identifying a user.

The user terminal comprises a storage unit for storing a license file, a license file creating unit, and a software execution unit. The license file creating unit creates the license file containing the license information generated by the license information generating unit, and stores the license file in the storing unit. The software execution unit, when execution of the software is designated, converts the software to executable form using the license information stored in the license file and expands it into memory, and commences operation in accordance with the expanded software.

That is, in the third licensee notification system, the software, which is presented to the user in non-executable form, is converted to executable form in accordance with the license information containing the user identification information every time execution is designated.

The fourth licensee notification system according to this invention is constituted of management center and user terminal. The subject of the system is software which judges the legitimacy of user identification information on the basis of signature information stored in a license file on commencement of operation and, if the user identification information is legitimate, commences proper operation after notifying this user identification information to the user, and, if the user identification information is not legitimate, terminates operation.

The management center comprises a license information generating unit that generates license information combining in integral form the user identification information identifying the user and signature information whose content is determined in accordance with the user identification information.

The user terminal comprises a storage unit for storing the license file and a license file creating unit that creates the license file containing the user identification information contained in the license information generated by the license information generating unit and stores the license file in the storage unit.

That is, in the fourth licensee notification system, the license information which is necessary for running the software normally is generated on the basis of the user identification information in the management center and is informed to the user terminal.

It may be noted that although in the first to the fourth licensee notification system any means could be employed for notification of the license information, if notification of license information is performed using a communication circuit, a system that is simple to operate can be formed.

Also, it is possible to employ information including the name of the user as user identification information. It is also possible to employ a unit that generates license information including user identification information encoded with a characteristic key of the software. In this case, software is presented to user which including instructions that command the user terminal to notify to the user the result of decoding the user identification information using the characteristic key.

In the first to the third licensee notification systems, it is also possible to make the software that is presented to the user encoded, and to make the conversion information for decoding the encoded software. Also, it is possible to employ, in such a licensee notification system, license information containing the user identification information in a form that cannot be separated without special information. For example, it is possible to employ information, as license information, which is the result of encoding the conversion information and user identification information, combined in integrated manner.

Also, it is possible to make the first to third licensee notification system a system whose subject is software that, if the signature information stored in the license file does not correspond to the user identification information, terminates operation, and, as the license file creating unit, to employ a unit that generates signature information whose content is determined in accordance with the content of the user identification information, and creates the license file containing the signature information. In this case, it can be made more difficult to alter the user identification information that is notified to the user on start-up of the software. Also, in the case of such software, it is possible to employ as license information generating unit a unit that generates license information containing signature information whose contents are determined in accordance with the contents of the user identification information, and, as license file creating unit, to employ a unit that creates the license file containing signature information contained in the license information.

Also, it is possible to make the second licensee notification system a system whose subject is software that, if signature information stored in the second predetermined location does not correspond to user identification information stored in a prescribed location, terminates its operation, and, as software rewriting unit, to employ a unit that rewrites the information of the prescribed location of the software with the user identification information contained in the license information and that rewrites the information at the second prescribed location of the software with signature information whose content is determined in accordance with the user identification information. Also, in the case of such software, it is possible to employ as license information generating unit a unit that generates license information containing signature information whose content is determined in accordance with the content of the user identification information, and, as software rewriting unit, to employ a unit that rewrites information of the prescribed location with user identification information contained in the license information and that rewrites the information at the second prescribed location in the software by signature information contained in the license information.

DESCRIPTION OF THE PREFERRED EMBODIMENTS

The present invention is described in detail below with reference to the drawings.

First embodiment

Figure 1:
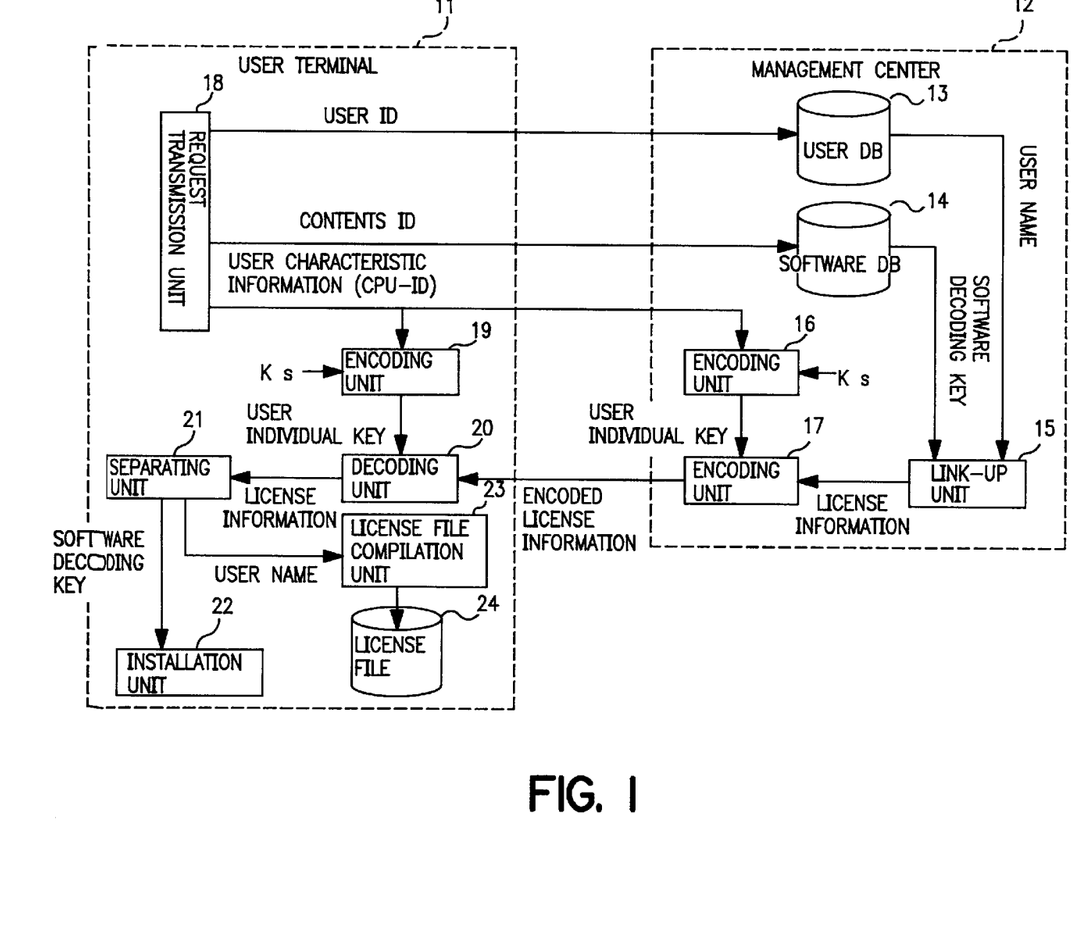
FIG. 1 is a functional block diagram illustrating the layout of a licensee notification system according to a first embodiment of the present invention.

FIG. 1 is a functional block diagram of a licensee notification system according to a first embodiment of the present invention. This licensee notification system is a system where CD-ROMs storing a large number of software items of restricted function are sold cheaply, and software sales are effected by selling the information needed to cancel the function restrictions of the software in this CD-ROM. Payment of the fee could be effected by for example notification of the subscriber number of a cash card or notification of a bank account withdrawal number or the like.

As shown in the drawings, the licensee notification system is constituted by user terminals 11 and management center 12 connected by means of a communication circuit. User terminals 11 and management center 12 may be described as computers and commence operation as an ensemble of the function blocks illustrated when prescribed programs are run.

First of all, the operation of management center 12 will be described.

Figure 2:
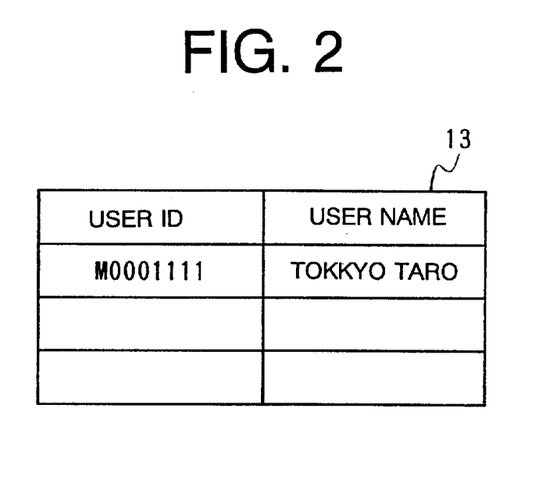
FIG. 2 is a diagram given in explanation of the content of the user database provided in the management center comprised in the licensee notification system according to the first embodiment.
Figure 3:
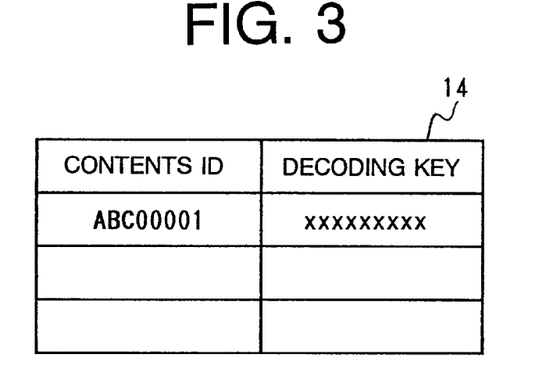
FIG. 3 is a diagram illustrating the content of the software database provided in the management center comprised in the licensee notification system according to the first embodiment.

Management center 12 is provided with two databases, called user database (user DB) 13 and software database (software DB) 14. As shown in FIG. 2, user DB 13 stores the correspondence relationship between the user ID, which is identification information given to users of this system by the manager, and the user name, which is the identification information of the user as employed in ordinary society. As shown in FIG. 3, software DB 14 stores the correspondence relationship between the contents ID, which is the identification information of each software item supplied and stored in the CD ROM, and the software decoding key, which is the decoding information needed to decode this software item.

A link-up unit 15 in management center 12 generates license information by combining the two data items: user name and software decoding key. An encoding unit 16 generates a user's individual key by encoding with key "Ks" the user characteristic information (details to be explained later) from user terminal 11. An encoding unit 17 generates coded license information by encoding the license information from link-up unit 15 using the user's individual key generated by encoding unit 16. In the present licensee notification system, a DES (data encryption standard) algorithm is employed for encoding and decoding.

The various function blocks that are not in management center 12 are arranged to operate synchronously when there is a request from user terminal 11 for information for removal of the function restrictions. Specifically, when management center 12 receives a request for information for removal of function restrictions relating to a software item from user terminal 11, it transmits to user terminal 11 coded license information containing the user's name and the software decoding key needed to remove the functional restrictions on the software item.

Next, the operation of user terminal 11 will be described. When user terminal 11 runs the programs for communication and installation, it executes the operation described below.

A request transmission unit 18 in user terminal 11 transmits to management center 12 information including the user ID, contents ID, and user's characteristic information.

Request transmission unit 18 commences operation when the keyboard (not shown) of user terminal 11 is operated in accordance with a prescribed procedure that is predetermined as the procedure for request of information for removal of functional restrictions. This request procedure includes keyboard input of the user ID and contents ID; request transmission unit 18 transmits to management center 12 the keyboard input information and the user's characteristic information, which is constituted by the ID of the CPU which is employed in user terminal 11.

As already explained, when a request for information for removal of functional restrictions is received from user terminal 11, management center 12 sends to user terminal 11 encoded license information. As a result, after request transmission unit 18 has been operated, user terminal 11 receives encoded license information from management center 12.

As shown in the drawings, the encoded license information is input to decoding unit 20 in user terminal 11. Decoding unit 20 also inputs the user's individual key, which is generated by encoding unit 19 using the user's characteristic information and "Ks". Using this user's individual key, decoding unit 20 decodes the encoded license information from center terminal 12. The license information, which is the result of this decoding, is input to separating unit 21, which is a unit that performs reverse processing against link-up unit 15 in management center 12. Separating unit 21 separates and extracts the software decoding key and user name from the license information, and respectively supplies the extracted software decoding key and user name to installation unit 22 and license file compilation unit 23.

Installation unit 22, using the software decoding key from separating unit 21, removes the functional restrictions on the specific software item (details to be described later) in accordance with the contents ID transmitted by request transmission unit 18. License file compilation unit 23 compiles a license file 24 using the user name and contents ID from separating unit 21.

Figure 4:
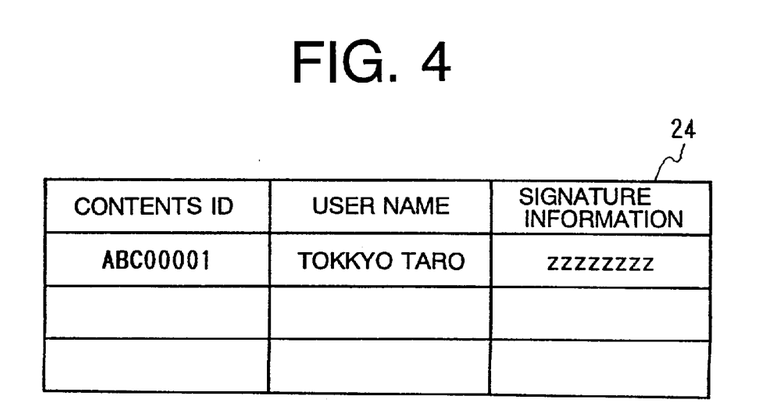
FIG. 4 is a diagram illustrating the content of a license file provided in a user terminal comprised in the licensee notification system according to the first embodiment.

FIG. 4 shows diagrammatically the contents of license file 24. As shown in the drawing, license file 24 stores information consisting of contents ID and user name, and signature information, which is information encoded using a signature key.

Further detailed description of the operation of installation unit 22 and the operation of the software installed by installation unit 22 is given below using FIG. 5 and FIG. 6. Of these Figures, FIG. 5 is a view showing diagrammatically the structure of software that is the subject of the present licensee notification system and FIG. 6 is a flow chart showing the operating sequence of the CPU in the user terminal when the software that is the subject of the present licensee notification system is actuated.

Figure 5:
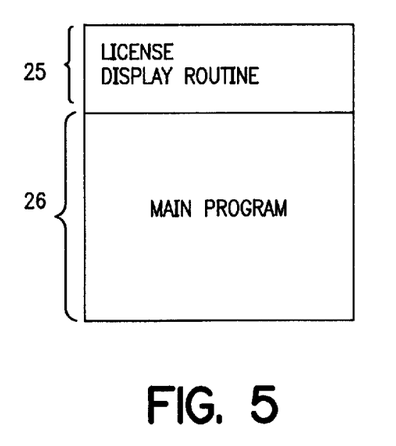
FIG. 5 is a diagram illustrating the structure of software that is the subject of the licensee notification system according to the first embodiment.

As shown in FIG. 5, the software that is the subject of the present system includes a license display routine 25 and main program 26. In the main program there are defined the operating procedures relating to the proper functions of this software; in license display routine 25, there is defined the content to be executed prior to execution of main program 26.

Figure 6:
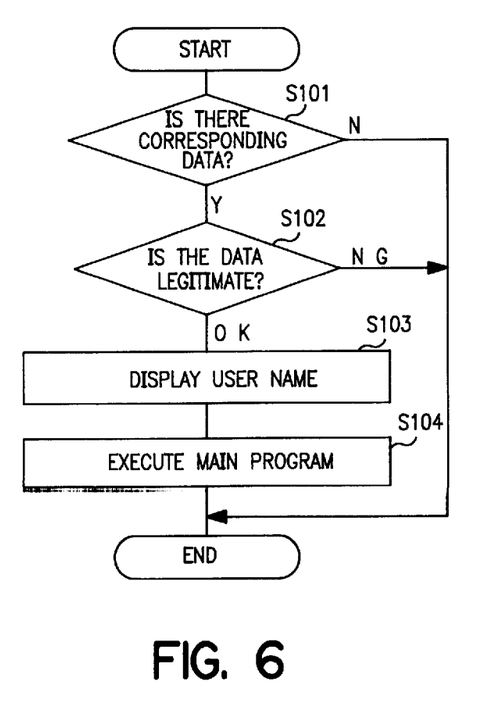
FIG. 6 is a flow chart illustrating the operating sequence of software that is the subject of the licensee notification system according to the first embodiment.

When this software is actuated, as shown in FIG. 6, the CPU, first of all, by checking the contents ID in the license file, decides whether or not data corresponding to the software that is being actuated is present in the license file (step S101). Then, if the corresponding data exists (step S101:Y), the CPU performs a check of the legitimacy of the corresponding data (step 102). In this step, the CPU encodes the information consisting of contents ID and user name stored in the license file using the signature key that is set as data in license display routine 25, and if the result of this encoding agrees with the signature information, decides that the data is legitimate.

If it is legitimate (step S102:OK), the CPU displays the user name which is read from the license file (step S103), and commences operation in accordance with the main program (step S104).

Also, if the corresponding data is not present in the license file (step S101:N) or if the content of the license file is found to be not legitimate (step S102:NG), i.e. if the content of the license file is found to be different from the result of the compilation performed by license file compilation unit 23, the CPU terminates operation without displaying the user name or executing the main program.

As described above, with the licensee notification system according to the first embodiment, in the user terminal, installation of the software is performed such that the user name is displayed on start-up, using the encoded license information supplied from the management center. Also, the installed software is executed only when the legitimacy of the license file is verified. As a result, with this licensee notification system, even if the software and license file are copied illicitly after being installed, it is difficult to change the user name appearing on start-up of the software. The person who has made the illicit copy has no alternative but to use the software with the name of another person being displayed. As a result, illicit copying of the software can be prevented if the present licensee notification system is employed.

It should be noted that the licensee notification system of the first embodiment could be modified in various ways.

It would for example be possible to constitute the system such that notification of the contents ID etc to the management center and notification of the encoded license information to the user terminal were performed by another information transmission unit, such as the post. In this case, the user terminal is constituted such that installation is effected using encoded license information input from the keyboard. It is also possible to constitute the system such that the license information is notified in un-encoded form.

It is also possible to arrange that the signature information is generated at the management center end, and encoded license information containing this signature information is notified to the user terminal.

It is also possible to constitute the system such that, instead of the user name and signature information, information representing the user name in encoded form is stored in the license file, and, when the installed software is executed, the information in the license file is decoded by the software and displayed.

It would also be possible to arrange that the software was converted into executable condition not on installation of the software but rather every time execution of the software was specified, the software then being expanded in the memory and operation commenced in accordance with the software now in the memory.

Also, the medium whereby the software is supplied is not restricted to CD-ROM; a supply mode could be adopted in which the software was stored on another recording medium such as a floppy disk, or downloaded through a communication circuit.

Second embodiment

Figure 7:
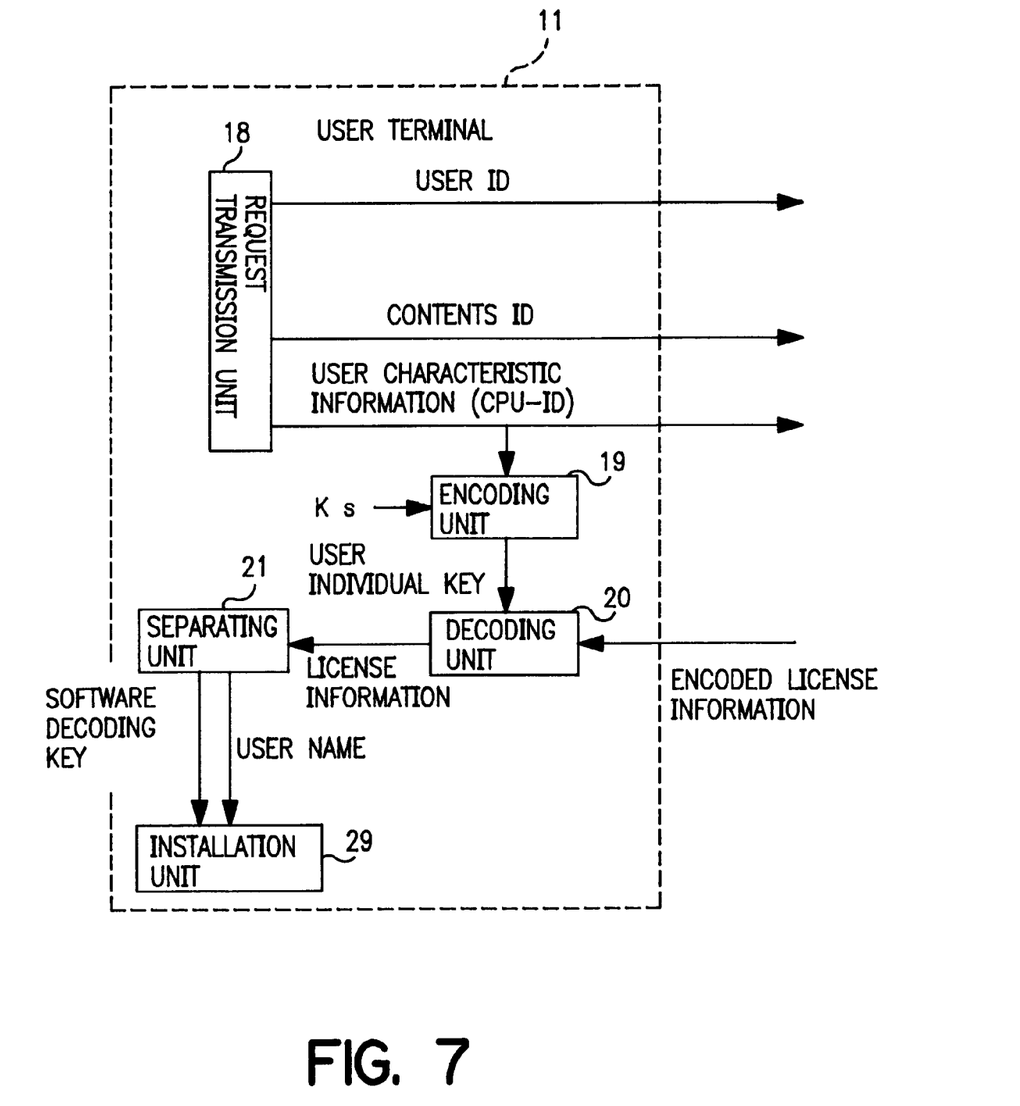
FIG. 7 is a function block diagram illustrating the organization of a user terminal employed in the licensee notification system according to a second embodiment.
Figure 8:
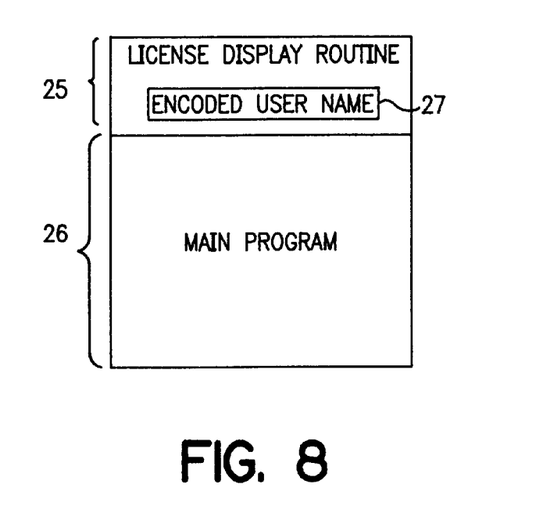
FIG. 8 is a diagram illustrating the structure of software that is the subject of the licensee notification system according to the second embodiment.
Figure 9:
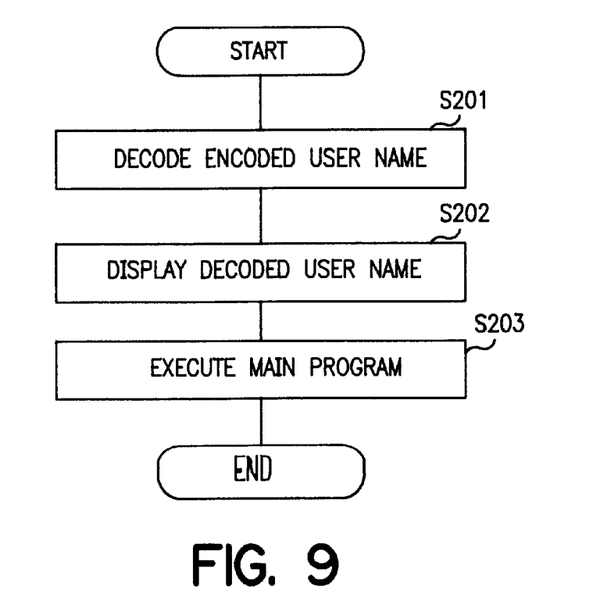
FIG. 9 is a flow chart showing the operating sequence of software that is the subject of the licensee notification system according to the second embodiment.

A licensee notification system according to a second embodiment of the present invention is described below with reference to FIG. 7 thru FIG. 9. Of these Figures, FIG. 7 is a functional block diagram illustrating the layout of a user terminal wherein a licensee notification system according to the second embodiment is provided. FIG. 8 is a diagram illustrating the structure of software that is the subject of this licensee notification system. FIG. 9 is a flow chart showing the operating procedure of the CPU when the software that is the subject of the present licensee notification system is executed.

In the licensee notification system according to the second embodiment, a management center of the same construction as management center 12 in the first embodiment is employed. Also, as can be seen from the functional block diagram shown in FIG. 7, the difference of the action of the user terminal 11 is slight, so the description will be confined to the parts of which the details of operation differ with respect to the licensee notification system of the first embodiment.

As shown in FIG. 7, in user terminal 11 according to the second embodiment, the software decoding key and user name that are separated by separating unit 21 are both input to the installation unit 29. Installation unit 29 effects installation by decoding the software in the CD ROM using the software decoding key, and generates the user name in encoded form by encoding the user name. Thus, installation unit 29, as shown diagrammatically in FIG. 8, writes the encoded user name 27 that is thus generated in a prescribed location of license display routine 25.

As shown in FIG. 9, when the software that is the subject of the licensee notification system of the second embodiment is started up, the encoded user name that was written in the prescribed location in license display routine 25 is read and decoded (step S201). Then, after display of the decoded user name has been performed (step S202), main program 27 is executed (step S203).

That is, with this licensee notification system, the user name that is displayed on start-up of the software is set by directly rewriting the content of the software.

Even with the licensee notification system of this second embodiment, enabling of the software such that the user's name is displayed on start-up is effected independently of keyboard input from the user terminal, so it is not possible to alter the user name that is displayed by the software simply by making an illicit copy of the installation software. Also, the installed software is executed only when the legitimacy of the license file has been verified. Consequently, with this licensee notification system, even if the installed software is illicitly copied, it is difficult to alter the user name that is displayed on start-up, so the person who has made the illicit copy has no alternative but to use the software with another person's name displayed. Thus, use of this licensee notification system can psychologically prevent illicit copying.

It should be noted that with this licensee notification system according to the second embodiment, various modifications are possible just as in the case of the licensee notification system according to the first embodiment.

For example, it would be possible to constitute a system such that the notification of the contents ID etc to the management center and the notification of the encoded license information to the user terminal were performed by another information transmission unit such as the post. And it is also possible to constitute a system such that license information is notified in un-encoded form.

Also, it is possible to constitute a system such that the software in question is made software wherein operation is stopped if signature information stored in a second prescribed location of the software does not correspond to user identification information stored in a first prescribed location and to arrange that the installation unit 29 writes the user name to the first prescribed location in the software and writes the signature information, consisting of this user name in encoded form, to the second prescribed location.

What is claimed is:

1. A licensee notification system for use in a software sales system in which software in non-executable form is presented to a user, and license information for converting the software into executable form is transmitted to the user on condition of payment of a charge, said licensee notification system comprising:

a management center that stores and maintains license information combining, in integrated form, conversion information for converting software to executable form and user identification information specifying the user; and a user terminal including:
a storage;
a converter that converts the software in non-executable form into executable form using the license information maintained by said management center and installs the software in executable form into said storage; and
a license file creator that creates a license file containing the user identification information along with signature information created based on the user information and stores the license file in said storage, and wherein the software includes instructions that command the user terminal to read user identification information in the license file and to notify the user identification information to the user on commencement of its operation and commands the user terminal to terminate operation if the signature information in the license file does not correspond to the user identification information in the license file.

2. A licensee notification system for use in a software sales system in which software in non-executable form is presented to a user, and license information for converting the software in non-executable form to executable form is informed to the user on condition of payment of a charge, said licensee notification system comprising:

a management center that stores and manages license information combining, in integrated form, conversion information for converting software to executable form and user identification information specifying a valid user; and a user terminal including:
a storage;
a converter that converts the software in non-executable form into executable form using the license information maintained by said management center and installs the software in executable form in said storage; and
software rewriting means for rewriting the license information and user information in a prescribed location of the software and for rewriting signature information, determined in accordance with the user identification information, in a second location in the software; and wherein the software includes instructions that commands the user terminal to read user identification information from the prescribed location in the software and to notify the user identification information to the user on commencement of the software operation along with instructions that command the user terminal to terminate operation if the signature information stored in the second prescribed location does not correspond to the user identification information stored in the prescribed location.

3. A licensee notification system for use in a software sales system in which software in non-executable form is presented to a user, and license information for converting the software in non-executable form to executable form is transmitted to the user on condition of payment of a charge, said licensee notification system comprising:

a management center that stores and manages license information combining, in integrated form conversion, information for converting software to executable form and user identification information specifying the user; and a user terminal including:
  a storage;
    a license file creator for creating a license file containing the user identification information and signature information created based on the content of the user identification information, and that stores the license file in said storage; and
  software execution means for converting, when execution of the software is designated, the software into executable form using the license information in the license file and expanding the software in executable form into memory and executing operation in accordance with the software in the memory; and wherein the software includes instructions that commands the user terminal to read user identification information in the license file and to notify the user identification information to a user on commencement of its operation and commands the user terminal to terminate operation if the signature information in the license file does not correspond to the user identification information in the license file.

4. A licensee notification system for use in a software sales system in which software that refers to license information is presented to a user, and the license information about the software is informed to the user on condition of payment of a charge, said licensee notification system comprising:

a management center that stores and maintains license information combining, in integrated form, user identification information specifying the user and signature information whose content is determined in accordance with the user identification information; and a user terminal including:
  a storage; and
  license file creating means for creating the license file containing the license information maintained by said management center and that stores the license file in the storage; and
  wherein the software includes instructions that command the user terminal to judge the legitimacy of the user identification information in the license file using the signature information in the license file on commencement of operation of the software and, if the user identification information is legitimate, to commence proper operation of the software after notifying the user identification information to the user, but, if the user identification information is not legitimate, to stop the operation of the software.

5. A licensee notification system according to claim 1, wherein the software includes instructions that command the user terminal to display the user identification information on a display of the user terminal.

6. A licensee notification system according to claim 1, wherein the user terminal further comprises:

transmitting means for transmitting a request signal which requests license information to the management center through a communication circuit; and said management center, when the request signal is received from the user terminal, generates license information and transmits the license information to the user terminal through the communication circuit.

7. A licensee notification system according to claim 1, wherein the user identification information includes the name of the user.

8. A licensee notification system according to claim 1, wherein the license information includes user identification information encoded with a characteristic key of the software; and the software includes instructions that command the user terminal to inform to the user the result of decoding the user identification information using the characteristic key.

9. A licensee notification system according to claim 1, wherein the software is presented to the user in encoded form, and the conversion information is information for decoding the software.

10. A licensee notification system according to claim 1, wherein the license information contains the user identification information in a form that is incapable of being separated without special information.

11. A licensee notification system according to claim 1, wherein the license information is the result of encoding the conversion information and user identification information, combined in integrated manner.

12. A licensee notification system for use in a software sales system in which software in non-executable form is presented to a user, and license information for converting the software into executable form is transmitted to the user on condition of payment of a charge, said licensee notification system comprising:

a management center that stores and maintains license information combining, in integrated form, conversion information for converting software to executable form, user identification information specifying the user and signature information whose content is determined in accordance with the content of the user identification information; and a user terminal including:
  a storage;
    a converter that converts the software in non-executable form into executable form using the license information maintained by said management center and installs the software in executable form into said storage; and
    a license file creator that creates a license file containing the user identification information and signature information contained in the license information and stores the license file in said storage, and wherein the software includes instructions that command the user terminal to read user identification information in the license file and to notify the user identification information to the user on commencement of its operation along with instructions that command the user terminal to terminate operation if the signature information in the license file does not correspond to the user identification information in the license file.

13. A licensee notification system for use in a software sales system in which software in non-executable form is presented to a user, and license information for converting the software in non-executable form to executable form is informed to the user on condition of payment of a charge, said licensee notification system comprising:

a management center that stores and manages license information combining, in integrated form, conversion information for converting software to executable form, user identification information specifying a valid user and signature information determined in accordance with the content of the user identification information; and a user terminal including
a storage;
a converter that converts the software in non-executable form into executable form using the license information maintained by said management center and installs the software in executable form in said storage; and
software rewriting means for rewriting the license information in a prescribed location of the software installed by said converter with the user identification information contained in the license information and rewriting the signature information in a second prescribed location in the software; and wherein the software includes instructions that commands the user terminal to read user identification information in the prescribed location in the software and to notify the user identification information to the user on commencement of the software operation along with instructions that command the user terminal to terminate operation if the signature information stored in the second prescribed location does not correspond to the user identification information that is stored at the prescribed location.

14. A licensee notification system for use in a software sales system in which software in non-executable form is presented to a user, and license information for converting the software in non-executable form to executable form is transmitted to the user on condition of payment of a charge, said licensee notification system comprising:

a management center that stores and manages license information combining, in integrated form conversion, information for converting software to executable form, user identification information specifying the user and signature information determined in accordance with the content of the user identification information; and a user terminal including:
a storage;
license file creator for creating a license file containing the user identification information and signature information contained in the license information maintained by said management center, and that stores the license file in said storing; and
software execution means for converting, when execution of the software is designated, the software into executable form using the license information in the license file and expanding the software in executable form into memory and executing operation in accordance with the software in the memory; and wherein the software includes instructions that commands the user terminal to read user identification information in the license file, notify the user identification information to a user on commencement of its operation and command the user terminal to terminate operation if the signature information in the license file does not correspond to the user identification information in the license file;

wherein said license information containing signature information whose content is determined in accordance with the content of the user identification information;

said license file creator creates the license file containing the signature information contained in the license information; and the software includes instructions that command the user terminal to terminate operation if the signature information in the license file does not correspond to the user identification information in the license file.

* * * * *